(12) United States Patent
Meshenky et al.

(10) Patent No.: US 7,278,472 B2
(45) Date of Patent: Oct. 9, 2007

(54) INTERNALLY MOUNTED RADIAL FLOW INTERCOOLER FOR A COMBUSTION AIR CHANGER

(75) Inventors: Steven P. Meshenky, Racine, WI (US); Robert J. Barfknecht, Waterford, WI (US); James J. Hennes, Milwaukee, WI (US); Kenneth M. Cornell, Oak Creek, WI (US)

(73) Assignee: Modine Manufacturing Company, Racine, WI (US)

( * ) Notice: Subject to any disclaimer, the term of this patent is extended or adjusted under 35 U.S.C. 154(b) by 182 days.

(21) Appl. No.: 10/251,537

(22) Filed: Sep. 20, 2002

(65) Prior Publication Data

US 2004/0055740 A1  Mar. 25, 2004

(51) Int. Cl.
*F28D 1/053* (2006.01)

(52) U.S. Cl. .................. 165/125; 165/51; 165/176; 60/599; 60/726; 60/751; 123/563; 415/179

(58) Field of Classification Search .............. 165/125, 165/176, 122, 51; 415/179, 178, 176; 417/243; 60/726, 751, 599; 123/563
See application file for complete search history.

(56) References Cited

U.S. PATENT DOCUMENTS

| | | | |
|---|---|---|---|
| 1,265,650 A | | 5/1918 | Graemiger |
| 1,425,855 A | | 8/1922 | Graemiger |
| 1,860,125 A | * | 5/1932 | Bassler ............. 165/165 |
| 2,361,726 A | * | 10/1944 | Weimar ............ 415/179 |
| 2,384,251 A | | 9/1945 | Hill |
| 2,474,410 A | | 6/1949 | Aue |
| 2,612,310 A | * | 9/1952 | Eggmann ........... 415/179 |
| 2,650,073 A | | 8/1953 | Holm |
| 2,925,954 A | | 2/1960 | Spillman et al. |
| 3,014,639 A | | 12/1961 | Boli |
| 3,134,536 A | | 5/1964 | Adams |
| 3,811,495 A | | 5/1974 | Laing |
| 4,062,401 A | | 12/1977 | Rudny et al. |
| 4,125,345 A | | 11/1978 | Yoshinaga et al. |
| 4,373,577 A | | 2/1983 | McMillen |
| 4,550,775 A | | 11/1985 | Edwards et al. |
| 4,706,736 A | | 11/1987 | Gyori |
| 5,077,601 A | | 12/1991 | Hatada et al. |

(Continued)

FOREIGN PATENT DOCUMENTS

CH        416 920        7/1966

(Continued)

OTHER PUBLICATIONS

Communication Pursuant to Article 96(2) EPC from the corresponding EPO application, no date.

*Primary Examiner*—John K. Ford
(74) *Attorney, Agent, or Firm*—Michael Best & Friedrich (57) ABSTRACT

An improved combustion air charger, such as a turbocharger or a supercharger, includes a housing (10) having a rotary shaft (18) journalled therein. At least one compressor wheel (20,22) is located on the shaft (18). The housing (10) includes an ambient inlet (30) as well as a compressed air outlet (32) and a heat exchanger (36) is located between at least one of the compressor wheels (20) and the outlet (32) and is arranged so that air flow through the heat exchanger (36) is generally in the radially inward direction.

7 Claims, 4 Drawing Sheets

U.S. PATENT DOCUMENTS

| | | |
|---|---|---|
| 5,078,206 A | 1/1992 | Goetz, Jr. |
| 5,172,752 A | 12/1992 | Goetz, Jr. |
| 5,303,770 A | 4/1994 | Dierbeck |
| 5,402,656 A | 4/1995 | Jaster et al. |
| 5,626,018 A * | 5/1997 | Hatfield ................. 60/726 |
| 5,704,211 A | 1/1998 | Hatfield |
| 6,170,568 B1 | 1/2001 | Valenzuela |
| 6,173,493 B1 | 1/2001 | Dierbeck |
| RE37,134 E | 4/2001 | Wilson |
| 6,526,751 B1 | 3/2003 | Moeckel |
| 6,764,279 B2 * | 7/2004 | Meshenky ................. 165/125 |
| 6,857,468 B2 | 2/2005 | Emrich |

FOREIGN PATENT DOCUMENTS

| | | |
|---|---|---|
| DE | 1 093 040 | 11/1960 |
| EP | 0 135 365 A2 | 3/1985 |
| EP | 0 911 505 A2 | 4/1999 |
| EP | 1 191 206 A2 | 3/2002 |
| GB | 1 210 185 | 10/1970 |
| JP | 3-286992 | 12/1991 |

* cited by examiner

INTERNALLY MOUNTED RADIAL FLOW INTERCOOLER FOR A COMBUSTION AIR CHANGER

FIELD OF THE INVENTION

This invention relates to a heat exchanger used as an intercooler in a combustion air charging device such as a turbocharger or a supercharger for engines.

BACKGROUND OF THE INVENTION

Combustion air chargers, such as turbochargers or superchargers, have been employed with engines, particularly internal combustion engines, for many years. In a turbocharger, at least one rotary compressor wheel is driven by the exhaust of the engine. In the case of a supercharger, at least one rotary compressor wheel is driven mechanically, usually by the rotary output of the engine. In either case, a compressor wheel is employed to compress ambient air prior to its admission to the engine to support combustion therein. Because the air is compressed, a given volume thereof will have a greater mole content of oxygen than an otherwise equal volume of air at ambient pressure. As a consequence, the additional oxygen permits the combustion of a greater quantity of fuel so that for a power plant of a given size, a greater power output may be derived as a result of the charging of the combustion air.

Over the years, it has been determined that the efficiency of such combustion air charging devices can be improved through the use of a so-called intercooling system. Because the air is heated as it is compressed, part of the efficiency derived by employing the combustion air charging device in the first place, i.e., the densification of the combustion air charged to the engine, is lost because a volume of hot compressed air will contain less oxygen than an equal volume of cooler compressed air when both are at the same pressure. Thus, for a given pressure, upon admission to an engine for combustion, a cooler combustion air charge will allow the development of more power within the engine than the same charge at the same pressure if at a higher temperature.

Consequently, intercoolers as mentioned previously have been employed to cool the air after it exits the combustion air charger (or a stage thereof) and prior to its admission to the engine so as to provide, for any given pressure, a maximum mole content of oxygen.

In many cases, the intercooler will be employed as a conventional, rectangular-shaped heat exchanger and is mounted side-by-side or to the front or rear of the usual heat exchanger employed for cooling engine coolant. While this sort of an arrangement adequately handles the cooling of the pressurized combustion air, it may have certain constraints in terms of size and the volume available in an engine compartment as, for example, in a vehicle, that houses both the engine and the various heat exchangers employed for cooling. It also may require extensive hose connections between the turbocharger, the intercooler and the engine combustion air inlet which necessarily require relatively large diameter hoses because of the low density of the combustion air and the consequent large volume thereof.

It has therefore been proposed to incorporate the intercooler within the combustion air charger itself to provide a more compact combustion air charging and intercooling system as well as to avoid large, bulky hose connections to the extent possible. The goal here is to incorporate the intercooling heat exchanger within the combustion air charger in such a way that it may be easily serviced, requires a minimum of plumbing connections and does not unduly increase the bulk of the combustion air charger.

The present invention is directed toward the provision of advantageous solutions to these problems in an intercooling heat exchanger that is intended to be located internally within the combustion air charger for an engine.

SUMMARY OF THE INVENTION

It is the principal object of the invention to provide a new and improved rotary compressor machine with cooling for use in providing cooled, compressed air for any of a variety of uses. It is also an object of the invention to provide an improved combustion air charging apparatus with an internal intercooler that is more compact than known such systems, that is easily serviced, and/or which requires a minimum of plumbing connections to the engine with which the system is used.

According to one facet of the invention, an exemplary embodiment thereof achieves one or more of the above objects in a rotary machine that includes a rotatable shaft having at least one compressor wheel thereon and a housing containing the compressor wheel and having an inlet to the compressor wheel and an outlet. A heat exchanger is disposed in the housing and is located between the compressor wheel and the outlet. The heat exchanger includes a core having a gas flow path with a substantial radial extent and a gas inlet in fluid communication with the compressor wheel and a gas outlet in fluid communication with the housing outlet. A coolant flow path is provided in the heat exchanger in heat exchange relation with the gas flow path and has a substantial axial extent. The heat exchanger has a donut-shaped core containing the flow paths, the core being substantially concentric with the shaft.

In a preferred embodiment gas flow is radially inward and the cross-sectional area of the gas flow path decreases in size as one progresses from the gas inlet to the gas outlet. The change in cross-sectional area may be stepwise or gradual, as desired.

In one embodiment, the core includes a center opening of a radius greater than the radius of the compressor wheel so as to allow the heat exchanger to be removed from its location within the housing by being axially slipped past the compressor wheel.

In another embodiment of the invention, the donut-shaped core is made up of a plurality of independent segments and may have its central opening of a smaller radius than the radius of the compressor wheel. In this embodiment of the invention, the heat exchanger may be removed, segment by segment, for servicing.

In one embodiment of the invention, the gas inlet to the heat exchanger is located at a radially outer location in relation to the gas outlet.

In a highly preferred embodiment, the heat exchanger has a donut-shaped core with a central opening concentric about the shaft and the gas inlet is defined by the radially outer periphery of the core. The outlet is defined by a radially inner periphery of the core. Coolant flow paths in the core extend generally axially from side to side therein.

According to another facet of the invention, there is provided a heat exchanger for use as an intercooler within a rotary machine and which includes a generally cylindrical core with a cylindrical open center adapted to receive a rotating component of the rotary machine. The heat exchanger core is defined by at least one circular row of spaced tube constructions that are elongated axially in an annular array about the open center. The at least one row of tubes defines a radially inner and a radially outer coolant flow path extending axially through the core between the ends thereof and fins extend between the tube constructions to define an air side flow path that extends from a radially outer periphery of the core to the open center, generally radially between the spaced tube constructions. An annular trough-like inlet/outlet header is fitted to one end of the core and has an annular, radially outer section in fluid communication with the radially outer coolant flow paths and an annular, radially inner section in fluid communication with the radially inner flow paths. A trough-like annular flow redirecting header is fitted to the opposite end of the core and is in fluid communication with both the radially inner and outer flow paths. An axially directed, male inlet port is disposed on the inlet/outlet header in fluid communication with one of the sections and an axially directed male outlet port is also located on the inlet/outlet header in fluid communication with the other of the sections.

In a preferred embodiment, the inlet/outlet header includes an annular baffle separating the sections.

In a preferred embodiment, there are at least two of the rows of tube constructions, one defining the radially outer coolant flow path and another defining a radially inner coolant flow path.

In an alternate embodiment of the invention, each of the tube constructions is divided into a radially inner flow path and a radially outer flow path.

One embodiment of the invention contemplates that the tube constructions be wedge-shaped in cross section and have radially outer, relatively wide extremities and relatively narrow, radially inner extremities connected by spaced side walls.

In one embodiment, the side walls of adjacent tube constructions in the row face each other and the facing side walls are generally parallel.

Preferably, serpentine fins are located between facing side walls and the tube constructions are formed of tubes.

Other objects and advantages will become apparent from the following specification taken in connection with the accompanying drawings.

DESCRIPTION OF THE PREFERRED EMBODIMENTS

The exemplary embodiments of the invention described herein are specifically disclosed as combustion air chargers in the form of a two stage turbocharger. However, it is to be understood that this description is for exemplification purposes and no restriction to combustion air chargers or to turbochargers or to the number of stages is intended. For example, the invention may be employed with efficacy in a single stage turbocharger and may be employed in single or multiple stage superchargers as well. Similarly, the invention may be utilized in any rotary machine having a rotary gas compressor wheel on a shaft where an application desirably includes the cooling of gas compressed by a compressor wheel. With the foregoing in mind, attention is directed to FIG. 1.

Figure 1:
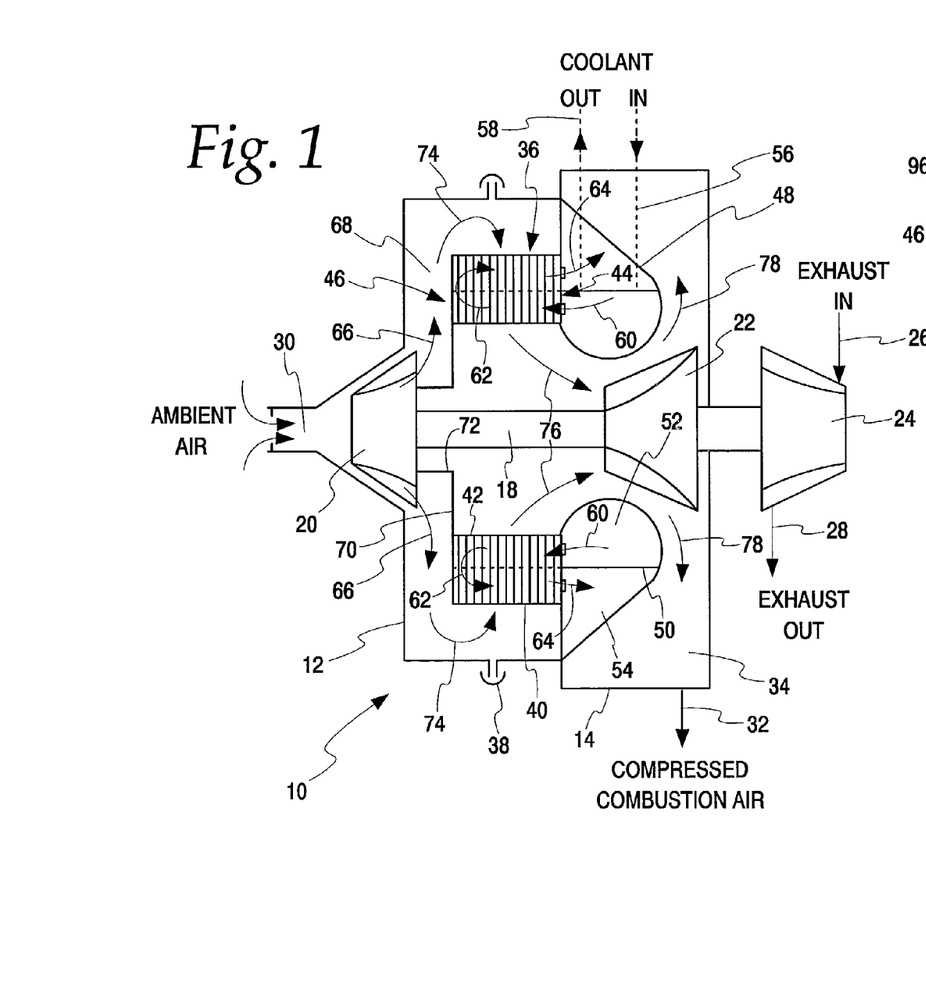
FIG. 1 is a somewhat schematic sectional view of a combustion air charger made according to the invention.

The exemplary embodiment of the invention is seen to include a housing, generally designated 10, formed of at least two separable sections, 12 and 14 respectively. Journalled within the housing 10 by any suitable bearings (not shown) is a rotary shaft 18. In the illustrated embodiment, the rotary shaft includes a first compressor wheel 20, a second compressor wheel 22 and turbine wheel 24 which, in turn, will be located within a housing (not shown). As indicated by an arrow 26, the turbine wheel 24 is driven by the exhaust from an internal combustion engine to drive the shaft 18. Spent exhaust is outletted from the turbine wheel 24 as indicated by arrow 28.

The housing 12 includes an ambient air inlet 30 while the housing 14 includes a compressed air outlet, schematically indicated by an arrow 32. The inlet 30 is to the inlet side of the compressor wheel 20 while the outlet 32 is from a volute, schematically illustrated at 34, on the outlet side of the compressor wheel 22.

A heat exchanger made according to the invention, generally designated 36, is contained within the housings 12,14 where the two are joined together as indicated schematically by removable fasteners 38. The heat exchanger 36 is donut-shaped or ring-shaped and includes a radially outer cylindrical surface 40 which defines an air inlet for the passage of air through the heat exchanger 36. A radially inner cylindrical surface 42 forms an air outlet for the heat exchanger 36.

The sides of the heat exchanger are provided with a first inlet/outlet header and tank, generally designated 44, on the side of the heat exchanger 36 located within the housing 14 and a redirecting header and tank, generally designated 46, on the side of the heat exchanger 36 within the housing 12. A coolant manifold 48 is located within the housing 14 to one side of the volute 34 and radially inward of the radially outer part of the volute 34. The manifold 48 is divided by an internal web or baffle 50 into a radially inner manifold section 52 and a radially outer manifold section 54. The system is provided with a coolant inlet schematically illustrated by an arrow 56 which extends to radially inner manifold section 52 and a coolant outlet 58 schematically illustrated by an arrow which extends to the radially outer manifold section 54. By a construction to be described in greater detail hereinafter, a coolant, such as coolant for the internal combustion engine, enters the turbocharger through the inlet and is passed to the radially inner manifold section from which it flows into the first header and tank 44 at a radially inner part thereof to flow axially through the heat exchanger 36 to the reentrant header and tank 46 where its direction is reversed to flow through the radially outer part of the heat exchanger 36 back to the inlet/outlet header and tank 44. From the header and tank 44, the coolant is discharged into the radially outer manifold section 54 to the coolant outlet 58. This flow of coolant is indicated by a series of arrows 60, 62 and 64.

Air flow through the turbocharger is as follows. Ambient air enters in the inlet 30 and passes to the inlet side of the compressor wheel 20. As the compressor wheel 20 is driven by the turbine wheel 24, the air is compressed and discharged at an elevated pressure on the radially outer periphery of the compressor wheel 20 as indicated by arrows 66. The compressed air continues to flow radially outwardly through an annular space 68 (a diffuser, not shown, conventionally is located in the space 68) between the housing 12 and the heat exchanger 36 which is in part defined by the reentrant header and tank 46, a radial baffle 70 extending radially inwardly from the reentrant header and tank 46 and an axial baffle 72 which extends from the baffle 70 at its radially innermost part to mount on a part of the housing 12 (not shown) in adjacency to the compressor wheel 20.

The radially outer side or periphery 40 of the heat exchanger 36 is spaced radially inwardly from the housings 12 and 14 allowing the air compressed by the turbine wheel 20 to be redirected as indicated by arrows 74 to enter the heat exchanger 36 at the radially outer periphery 40 thereof. The air then passes through the heat exchanger 36 in a radially inward direction and is cooled by the coolant that flows axially through the heat exchanger 36 as mentioned earlier. The cooled, compressed air is then discharged from the heat exchanger 36 as indicated by arrows 76 to the inlet side of the compressor wheel 22 whereat it is further compressed and then discharged into the volute 34 as indicated by arrows 78. This compressed air is then discharged as compressed combustion air to the internal engine to support combustion therein. If desired, additional cooling stages could be included between the compressor wheel 22 and the engine. Alternatively, as mentioned previously, in a single stage turbocharger, the compressor wheel 22 can be omitted in which case the air being discharged from the radially inner side or periphery 42 of the heat exchanger 36 could be discharged directly into the volute 34.

A feature of the invention as thus far described includes the fact that the radially inner periphery 42 of the heat exchanger has a larger diameter than the outer diameter of the turbine wheel 20 as seen in FIG. 1. Thus, by removing the fasteners 38 and separating the housing 12 from the housing 14, the heat exchanger 36 may be slipped axially to the left as viewed in FIG. 1 and about the turbine wheel 20 for servicing. That is to say, the turbine wheel 20 does not require removal from the shaft 18 to allow removal of the heat exchanger 36.

It will also be appreciated that much of the plumbing for both air and coolant is contained within the turbocharger itself, providing a compact assembly and minimizing piping losses. For example, large diameter, external hoses connecting the compressor to an external heat exchanger are completely avoided.

Figure 2:
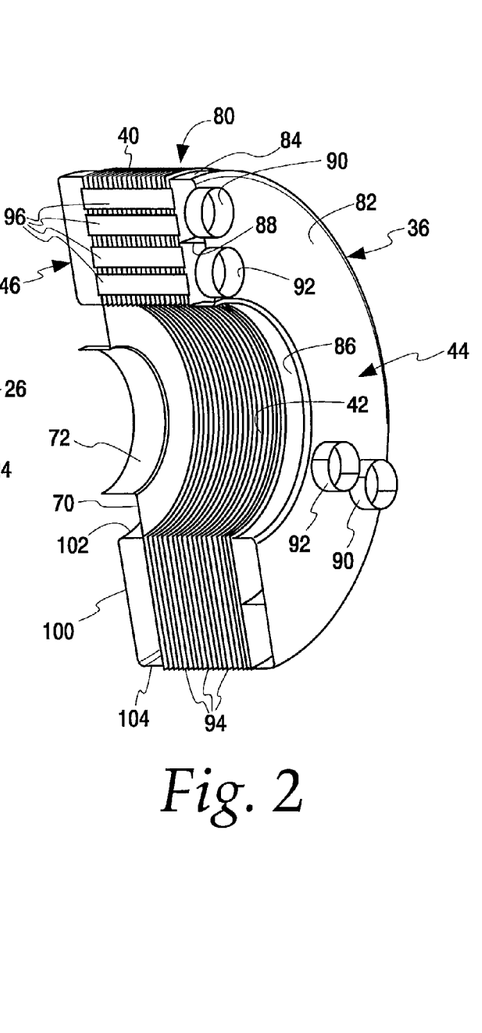
FIG. 2 is a fragmentary, perspective view of one form of heat exchanger employed in the invention.

Turning now to FIG. 2, one embodiment of the heat exchanger 36 will be described in greater detail. The heat exchanger 36 includes a core, generally designated 80, sandwiched between the headers and tanks 44 and 46. The header and tank 44 is an annular or ring-shaped trough with a bottom 82 flanked by radially outer side wall 84 and a radially inner side wall 86 which abut the core 80 and are sealed thereto at the radially outer and radially inner peripheries 40 and 42, respectively. Within the trough is an annular baffle 88 which separates a tubular, cylindrical outlet port 90 at the radially outer part of the bottom 82 from a tubular, cylindrical inlet port 92 at the radially inner part of the bottom 82. If desired, several of the ports 90,92 may be provided, preferably at equally angularly spaced locations about the header and tank 44.

The core itself, as illustrated in FIG. 2, is made up of a plurality of ring-like plate fins 94 that are provided with suitable tube slots to receive axially elongated, tubes 96 which are disposed in four rows as illustrated in FIG. 2. When plates fins such as the plate fins 94 are used, the openings in the plate fins 94 receiving the tubes 96 will have the same cross section as the tubes and will be constructed so that a tight mechanical fit is achieved to enhance heat transfer. Solder or braze metal may also be utilized to secure the fins 94 and tubes 96 together. The tubes 96 will generally be of the flattened type of a generally oval nature, or a wedge-shaped cross section, as will be described. A wedge-shaped cross section is preferred in construction employing serpentine fins while flattened tubes may be used in either plate fin or serpentine fin construction.

The header and tank 46 is likewise a trough-shaped, annular ring having a bottom 100 flanked by side walls 102 and 104 at the radially inner and radially outer parts of the core 80 and metallurgically bonded and sealed thereto. Thus, coolant flowing into the inlet ports 92 is directed through the two radially inner tubes 96 axially to the reentrant header and tank 46. As the header and tank 46 does not have a baffle such as the baffle 88, the flow of coolant, as it leaves the tubes 96 to enter the header and tank 46, moves radially outward to the two outermost tubes 96 whereat it is returned to the outlet port 90.

Figure 3:
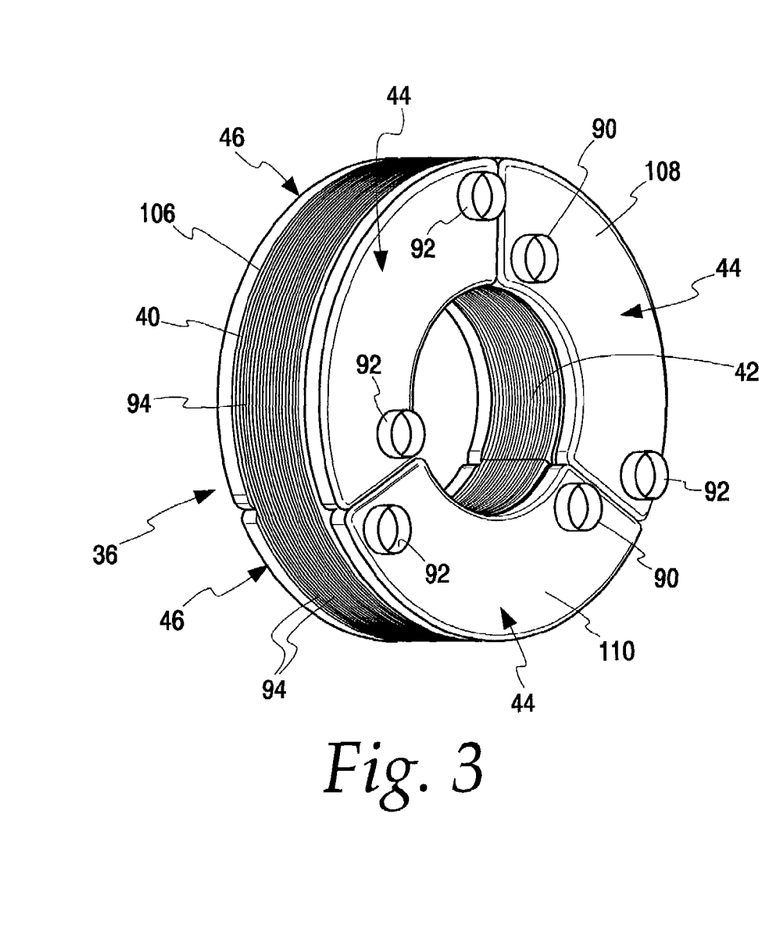
FIG. 3 is a perspective view showing an alternate form of heat exchanger employed in the invention.

As shown in FIG. 2, the heat exchanger 36 is formed as a single ring having the full extent of 360°. However, as illustrated in FIG. 3, the heat exchanger 36 may be broken into a plurality of independent segments shown at 106, 108 and 110. Each of the segments 106, 108 and 110 are provided with the ports 90 and 92 as well as the fins 94 and the tubes 96 (not shown in FIG. 3). This construction allows the use of a larger heat exchanger if desired. Specifically, with the embodiment shown in FIG. 3, the radially inner periphery 42 may be smaller in radius than the compressor wheel 20 and still permit ready servicing. In this case, it is only necessary to remove the heat exchanger 36 segment by segment by moving the segments 106, 108, 110 individually in a combination of axial and radial directions after the housing 12 (FIG. 1) has been removed from the housing 14.

Figure 4:
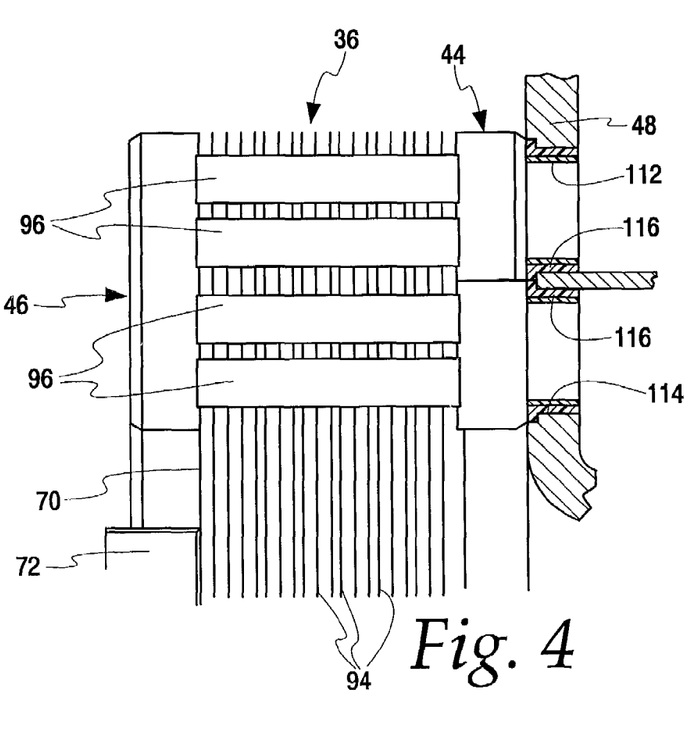
FIG. 4 is an enlarged, fragmentary, sectional view of the heat exchanger illustrated in FIG. 2 when installed in the combustion air charger.

FIG. 4 illustrates, fragmentarily, the installation of the embodiment of FIG. 2 into the manifold 48. Specifically, the manifold 48 includes a radially outer port or bore 112 and a radially inner port or bore 114 which aligned with the ports 90 and 92, respectively. Within each port 112,114 is a tubular grommet/seal 116 which slidingly and sealingly receives a respective one of the ports 90,92 to seal the heat exchanger 36 to the manifold 48. Thus, a "plug-in" instruction is provided whereby the heat exchanger 36 may be readily installed or removed from the turbocharger. Importantly, the heat exchanger 36 is secured to the housing at the manifold 48, but is not secured to the turbocharger housing at other locations. As a consequence, the heat exchanger 36 may expand axially within the housing 10 thereof. This minimizes stress generated by thermal cycling that occurs when the heat exchanger is placed in use and then taken out of use, and then placed in use again, etc., as when the engine is running, shut down and started again.

Figures 5, 6, 7, 8, 9:
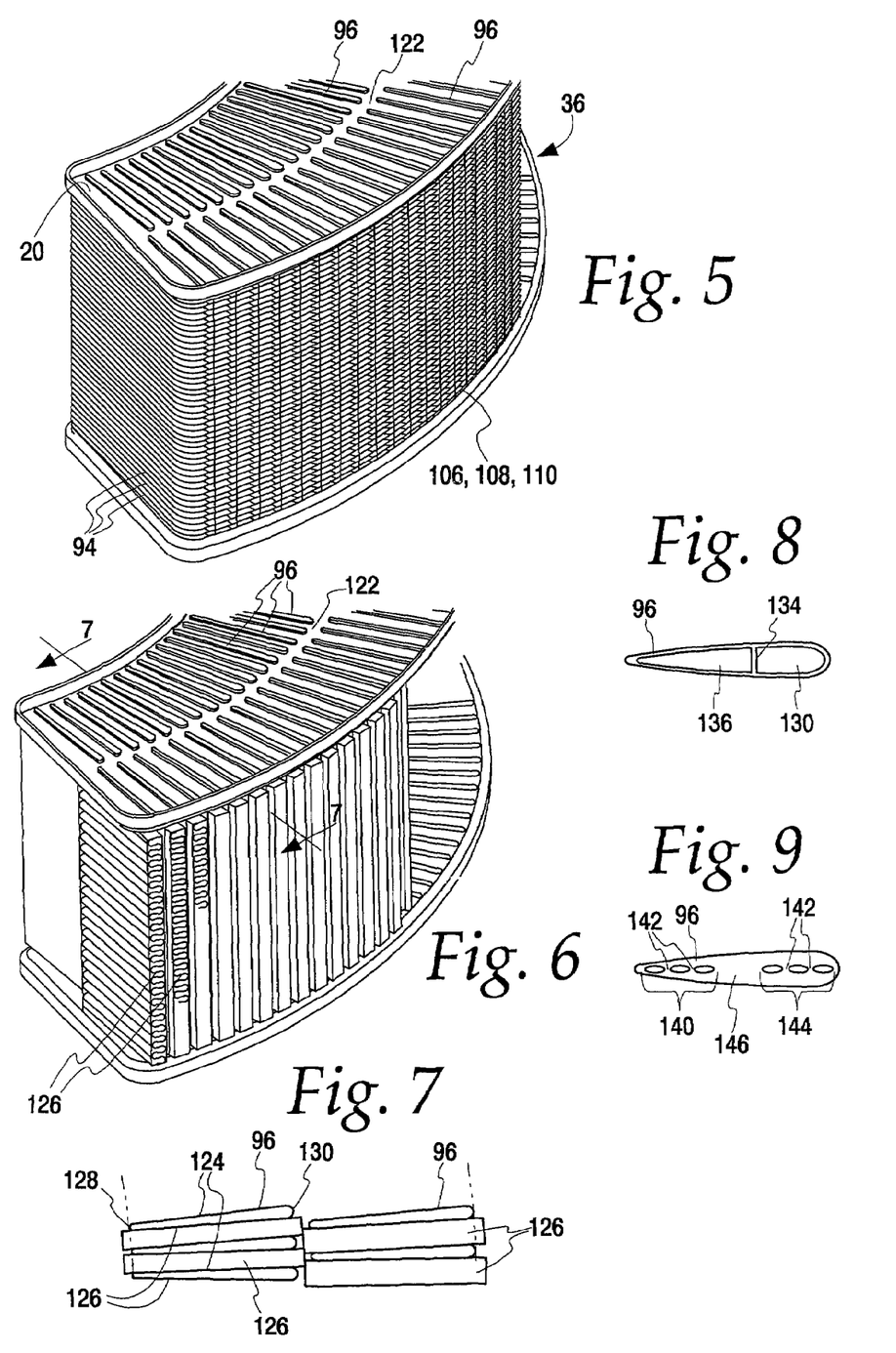
FIG. 5 is a perspective view illustrating one type of fin construction usable in the invention.
FIG. 6 is a view similar to FIG. 5 but illustrating an alternate, and preferred form of fin construction.
FIG. 7 is a somewhat schematic, enlarged, sectional view taken approximately along the line 7-7 in FIG. 6.
FIG. 8 is an enlarged, cross-sectional view of one type of tube that may be employed in the invention.
FIG. 9 is a view similar to FIG. 8 but showing another type of tube.

FIG. 5 illustrates a somewhat modified embodiment of the invention wherein the heat exchanger 36 is made into a plurality of segments, only one of which is fractionally shown in FIG. 5. The plate fins 94 can be readily seen and it will be appreciated that in this particular embodiment, the header plate 120 of one of the headers 44,46 is apertured to provide only two rows of the tubes 96. The tube rows are separated by an imperforate area 122 which aligns with the baffle 88 on the header 44. It will also be seen in FIGS. 5 and 6 that the tubes 96 are of wedge-shaped cross section and have spaced, flat sides 124,126, which extend between and connect a relatively small, radially inner extremity 128 and a relatively large, radially outer extremity 130. The number of tubes in each row is the same.

In the embodiment illustrated in FIG. 6 and FIG. 7, serpentine fins 126 may be employed because facing flat sides 124,126 of adjacent ones of the wedge-shaped tubes 96 are caused to be parallel to one another, thereby allowing the use of serpentine fins. This is desirable in many instances because conventional serpentine fins, without modification may be employed whereas special tooling will be required to provide plate fins. At the same time, the plate fins allow the exterior cross section of each of the tubes 96 to be varied somewhat to achieve desired flow characteristics if that is important in a given application.

It will be appreciated from FIG. 6 that if desired, the tubes 96, in either a serpentine fin or a plate fin configuration can be staggered, which is to say that the tubes 96 in the radially inner row are aligned with the fins 126 in the radially outer row and vice versa. This increases the tortuous nature of the path of air flow through the core 80 and thereby enhances heat transfer.

In high pressure applications, each of the tubes may include a plurality of flow paths separated by webs so as to prevent the tubes from "going round" under the influence of high pressures. Generally, this will not be a problem where plate fins are used but could be a problem where serpentine fins are employed.

It is also possible to provide a single row of tubes using, for example, the tube illustrated in FIG. 8. This is an extruded, wedge-shaped tube with a single web 134 separating the interior of the tube into a radially inner flow path 136 and a radially outer flow path 138. The header 44 is configured so that the baffle 88 will align with the web 134 to separate flow in the channels 136 and 138.

It will be noted that the web 134 is displaced from the center, from right to left, of the tube shown in FIG. 8 so that the cross-sectional areas of the flow paths 136 and 138 are the same.

If desired, a tube such as used in FIG. 9 may be employed. The same is again of wedge-shaped cross section and may be extruded. This tube is provided with a series of radially inner flow paths 140 separated by webs 142 to provide enhanced pressure resistance. Also includes a series of radially outer flow paths 144 that are also separated by webs 142, again for pressure resistance. Each of the flow paths 140 and 144 are of the same cross-sectional area so that velocity of the coolant in the radially inner flow paths 140 will match the velocity of the coolant in the radially outer flow paths 144. The flow paths 140 and 144 may be separated by a small, blank region 146 that is intended to align with the baffle 88.

The specific embodiments thus far described employ wedge-shaped tubes to allow the use of serpentine fins but may be used with plate fins as well. As alluded to above, serpentine fins are readily available and may be made without modification for use in a heat exchanger made according to the invention. Generally speaking, a high pressure application requires extruded tubes. However, welded wedge-shaped tubes in plain, dimpled, or rolled form with variable height inserts bonded to the interior walls of the tubes or similar flattened tubes with constant height inserts may be utilized in relatively lower pressure applications. In fact, it is not necessary to use tubes, as conventionally understood, at all. Where plate fins are being employed, each plate fin, about an opening serving as part of a tube may be provided with a flange which nests in an aligned opening in the adjacent fin and sealed thereto. In this way, a stack of plate fins with integral conduits which serve as tubes provide a tube construction. This technique performs no part of the invention, it being known in the art. It is mentioned simply as an acceptable alternative to the use of tubes such as disclosed herein.

When the inner and outer rows of tubes have tubes of the same exterior cross section, the fin height of the outer rows is increased as can be ascertained from FIG. 6, thereby providing an increased amount of air side surface area in the heat exchanger to improve performance.

On the other hand, fins with the same fin height may be used in all rows if the cross sections of the radially outer tubes are made larger to preserve identical spacing between adjacent tubes. To the extent that this increases the coolant flow area in the radially outer part of the tubes, and thus may reduce performance on the coolant side of the heat exchanger, it is possible to overcome this by utilizing the tube of FIG. 9.

Figure 10:
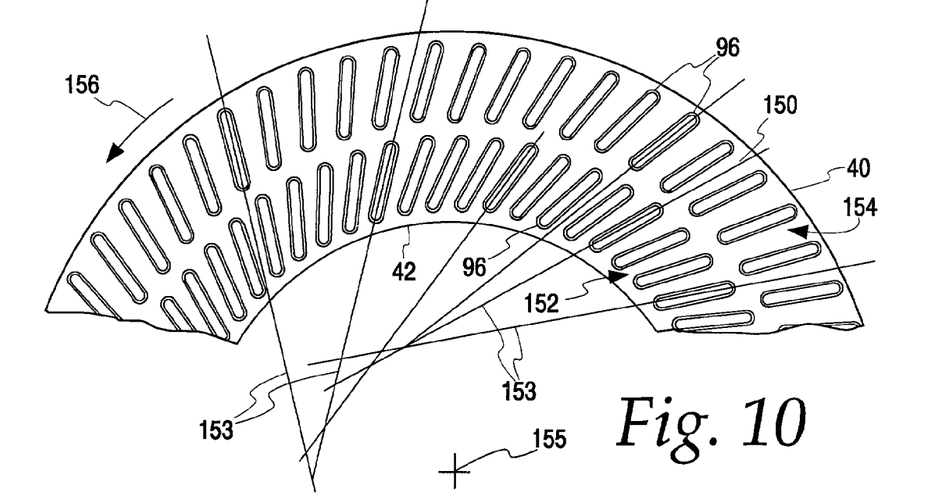
FIG. 10 is a fragmentary sectional view similar to FIG. 7 but illustrating a flattened tube, plate fin construction.

Turning now to FIGS. 10-12, inclusive, other tube and fin constructions may be employed. In FIG. 10, plate fins 150 (only one of which is shown) in inner and outer rows, generally designated 152 and 154 respectively, include flattened tubes 96. The number of the tubes 96 in the outer row 154 can be made identical to the number of tubes 96 in the inner row 152 and it will be seen that the tubes in the outer row 152 are staggered with respect to the tubes in the outer row 154. Specifically, the tubes 96 in the inner row 152 are aligned with the spaces between two adjacent ones of the tubes 96 in the outer row 154 to provide a tortuous flow path for the compressed air as it passes through the fins 150 and the tubes 96.

In addition, it will be seen that the major axis 153 of the tubes 96, when extended, does not go through the center 155 of the core but will be tangential to a circle (not shown) concentric with the center 155 of the core. As is well known, the nature of a rotary compressor such as that shown at 20 (FIG. 1) is such that the outflow of compressed air therefrom will be swirling circumferentially as, for example, in a direction indicated by an arrow 156 in FIG. 10 as well as moving axially along the radially outer side 40 (FIG. 1) of the core. The canting of the tubes 96 is against the direction of the swirling air flow 156 and provides a smoother transition of the gas into the spaces between the tubes 96 to minimize turning losses of the gas stream, and thereby reduce pressure loss.

Figure 11:
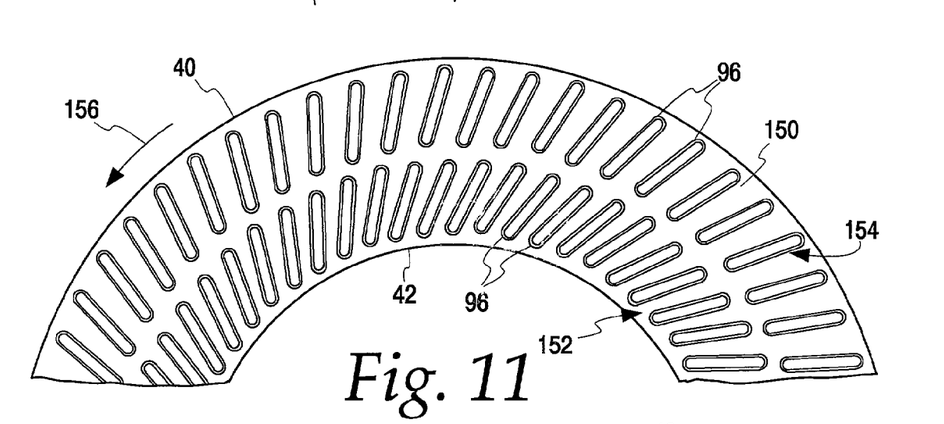
FIG. 11 is a fragmentary sectional view similar to FIG. 8 but showing the tubes in adjacent rows of tubes aligned with one another.

FIG. 11 shows an alternate type of tube and fin arrangement which is identical to that shown in FIG. 10 except for the fact that the tubes 96 in the inner row 152 are aligned with the tubes 96 in the outer row 154.

Figure 12:
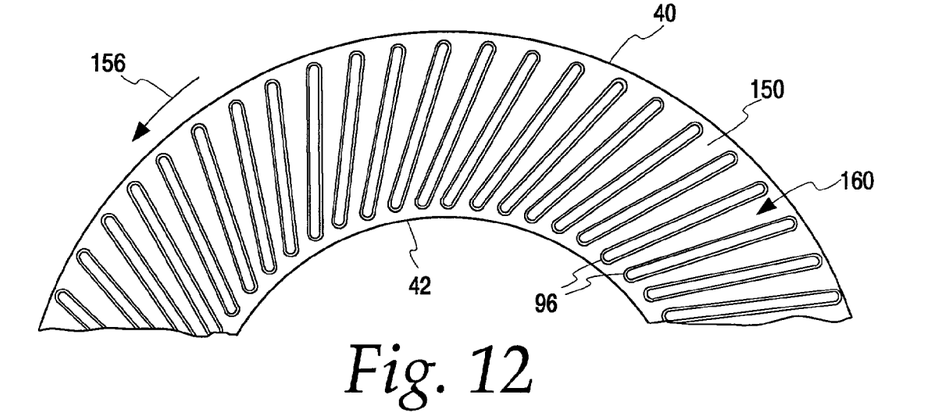
FIG. 12 is a fragmentary sectional view like FIGS. 8 and 11 showing a single row of tubes of flattened cross section in a plate fin construction.

FIG. 12 shows still another embodiment employing plate fins 150 with a single row of tubes, generally designated 160. In this case, the tubes 96 in the row 160 are flattened tubes that may be constructed with multiple channels as in the case of the embodiments illustrated and described in connection with FIGS. 8 and 9. Again, the tubes 96 are canted oppositely of the direction of swirl 156 of the air flow.

As will evident to the discerning eye, in the embodiments illustrated in FIGS. 6, 7, and 10-12, the cross-sectional area of the gas flow path through the core decreases as one proceeds from the radially outer side 40 of the core to the radially inner side 42 thereof. In the case of the embodiment shown in FIGS. 6 and 7, this is due to the different fin heights of the fins 126 in the radially inner row and the fins 126 in the radially outer row as is apparent from FIG. 7. This embodiment, of course, employs wedge-shaped tubes.

In the case of the embodiments shown in FIGS. 10-12, inclusive, where flattened tubes 96 are employed, it is due to the fact that the major axes of the tubes 96 converge upon one another, as do the side walls thereof, as one moves from the radially outer side 40 of the core to the radially inner side 42 thereof. Thus, when flow is in the preferred direction, that is, from the radially outer periphery 40 of the core to the radially inner periphery 42, as the compressed air is cooled within the heat exchanger 36, it becomes more dense and its volume is reduced as it flows to a lesser volume area within the heat exchanger 36. This feature of the invention allows the air velocity to be maintained as it passes through the heat exchanger 36 to increase heat exchanger efficiency without unduly increasing pressure drop. It will be appreciated that if the air flow was through a gas flow path of constant cross-sectional area, the velocity of the air flow through the heat exchanger 36 would progressively decrease as the compressed air was cooled, thereby lowering its velocity and at the same time, reducing the heat transfer coefficient. Consequently, the just described feature of the invention increases heat transfer efficiency by maintaining the velocity at a desired level.

Of course, if the velocity decrease were not of concern, the cross-sectional area could be made to be constant as, for example, by using wedge-shaped tubes with the adjacent sides of adjacent tubes being parallel to one another and with fewer tubes in the radially inner row than in the radially otuer row.

The reduction in cross-sectional area can be achieved either as a stepwise function as will occur with the construction illustrated in FIGS. 6 and 7 or as a gradual and progressive decrease in cross-sectional area in the outer periphery 40 to the inner periphery 42 as with the embodiments illustrated in FIGS. 10-12 inclusive.

It is also to be noted that the feature of the invention employing the canting of the tubes 96 to reduce pressure drop by reducing turning losses, while illustrated with flattened tubes, can also be achieved through the use of wedge-shaped tubes as well.

Other advantages will be apparent to those skilled in the art from the foregoing description which is intended to be exemplary and not limiting.

The invention claimed is:

1. In a rotary machine including a rotatable shaft having at least one compressor wheel thereon and a housing containing at least said one compressor wheel and having an inlet to said compressor wheel and an outlet;
    a heat exchanger in said housing located between said compressor wheel and said outlet, said heat exchanger having a gas flow path having a substantial radial extent and having a gas inlet in fluid communication with said compressor wheel and a gas outlet in fluid communication with said housing outlet, said heat exchanger having a donut-shaped core with a central opening concentric about said shaft and with said gas inlet being defined by a radially outer periphery of the core and said gas outlet being defined by a radially inner periphery of the core, and coolant flow paths in said core extending generally from side to side therein, said coolant flow paths have common inlets and common outlets, said common inlets and common outlets being on the same side of the core and being defined by respective circular tanks having axially directed ports alignable with axially directed ports in said housing, said tank ports and said housing ports having sealed, mating, male/female constructions that allow the side of said core opposite said same side to move axially relative to said housing, said core being removably secured to said housing.

2. The rotary machine of claim 1 wherein said central opening is of larger radius than said compressor wheel.

3. The rotary machine of claim 1 wherein said central opening is of smaller radius than said compressor wheel.

4. The rotary machine of claim 3 wherein said heat exchanger is made up of a plurality of arcuate segments.

5. In a rotary machine including a rotatable shaft having at least one compressor wheel thereon and a housing containing at least said one compressor wheel and having an inlet to said compressor wheel and an outlet;
    a heat exchanger in said housing located between said compressor wheel and said outlet, said heat exchanger having a gas flow path having a substantial radial extent and having a gas inlet in fluid communication with said compressor wheel and a gas outlet in fluid communication with said housing outlet, said heat exchanger having a donut-shaped core with a central opening concentric about said shaft and with said gas inlet being defined by a radially outer periphery of the core and said gas outlet being defined by a radially inner periphery of the core, and coolant tube construction in said core extending generally from side to side therein, said tube construction being canted to one side of radial lines extending through a rotational axis of said shaft and against a direction of swirl of gas exiting said compressor wheel such that a radially outermost portion of each tube in said tube construction is located circumferentially upstream with respect to a radially innermost portion of the same tube to reduce pressure drop.

6. The rotary machine of claim 5 wherein said tube construction is in at least two rows including a radially inner row and a radially outer row, where the inner row is encircled by the outer row, one serving as said gas inlet and the other serving as said gas outlet, and said canted tube construction is in at least one of the radially inner row and the radial outer row.

7. The rotary machine of claim 6 wherein said canted tube construction is in both said rows.

* * * * *

UNITED STATES PATENT AND TRADEMARK OFFICE
CERTIFICATE OF CORRECTION

PATENT NO. : 7,278,472 B2  Page 1 of 1
APPLICATION NO. : 10/251537
DATED : October 9, 2007
INVENTOR(S) : Steven P. Meshenky et al.

It is certified that error appears in the above-identified patent and that said Letters Patent is hereby corrected as shown below:

On the Title Page, Item -54- & col. 1, lines 1-3, should read

--INTERNALLY MOUNTED RADIAL FLOW INTERCOOLER FOR A COMBUSTION AIR CHARGER--

Signed and Sealed this

Tenth Day of February, 2009

JOHN DOLL
*Acting Director of the United States Patent and Trademark Office*